March 18, 1952     C. N. EHRLICH     2,589,351
VARIABLE CONDENSER
Filed Feb. 27, 1947     6 Sheets-Sheet 1
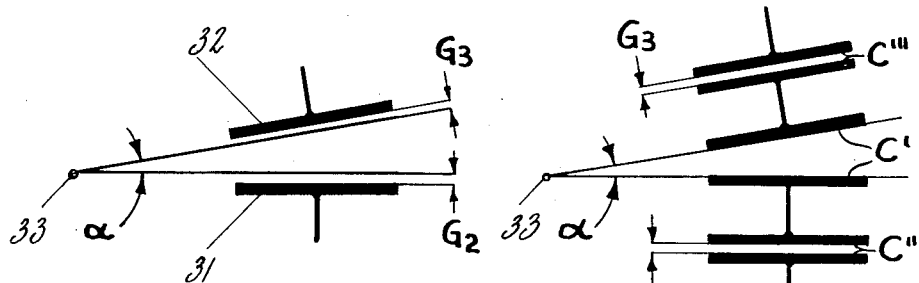
FIG.1     FIG.2
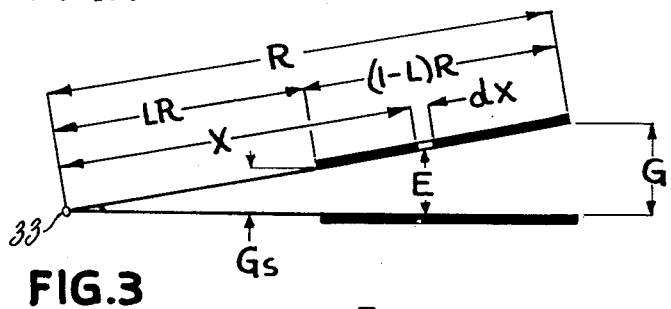
FIG.3
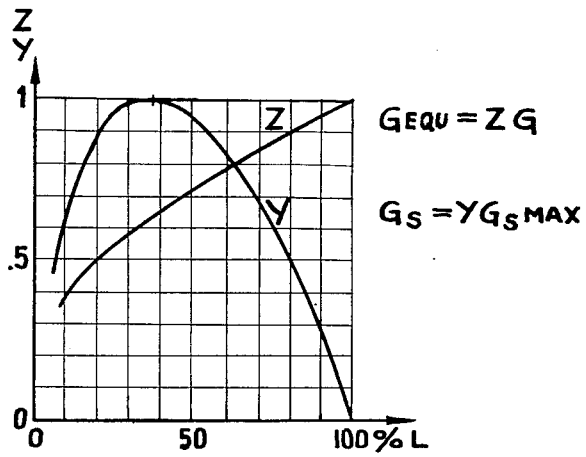
$G_{EQU} = ZG$
$G_S = YG_{S\,MAX}$
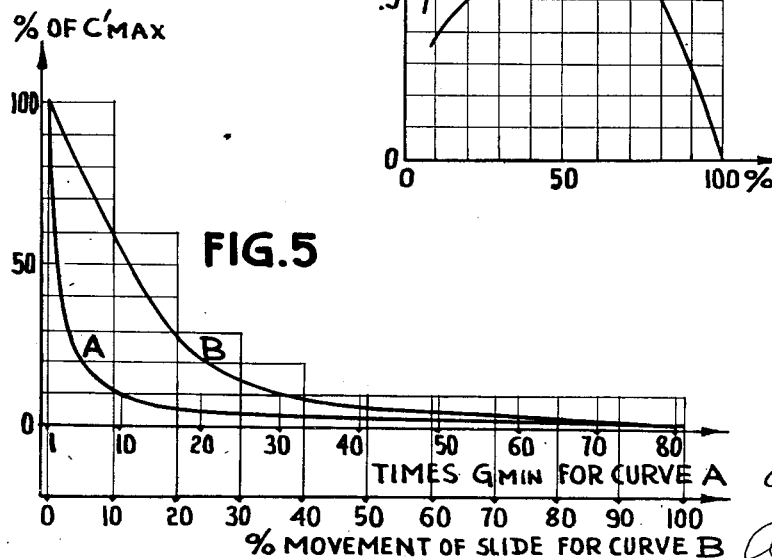
FIG.5     FIG.4
INVENTOR
CHARLES N. EHRLICH
BY
Alfred E. Page
ATTORNEY March 18, 1952 C. N. EHRLICH 2,589,351
VARIABLE CONDENSER
Filed Feb. 27, 1947 6 Sheets-Sheet 2
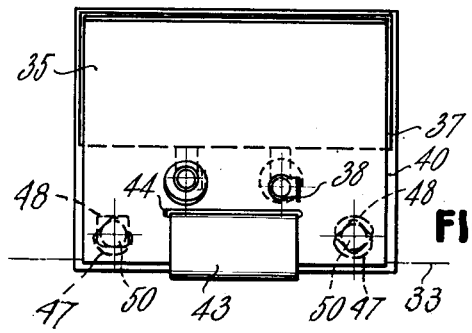
FIG.6
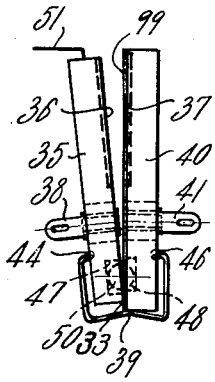
FIG.7
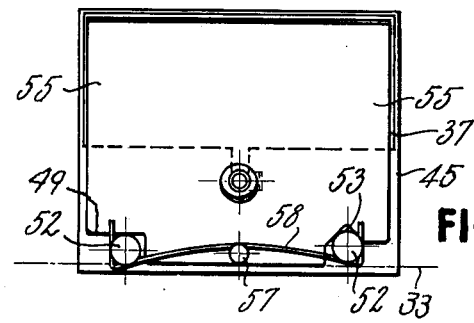
FIG.8
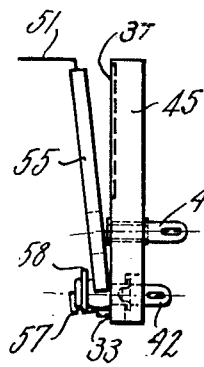
FIG.9
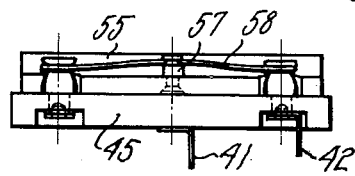
FIG.10
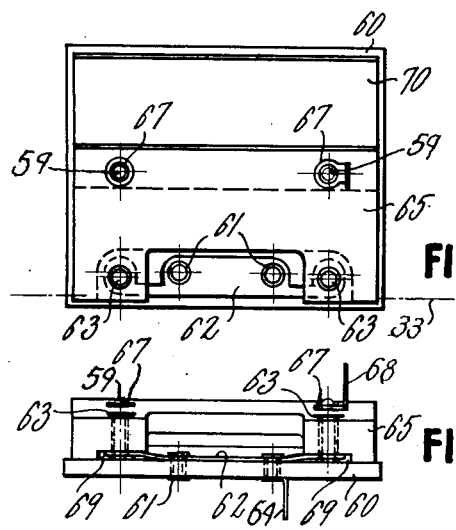
FIG.11
FIG.13
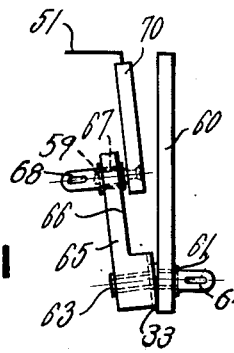
FIG.12
INVENTOR
CHARLES N. EHRLICH
BY
Alfred E. Page
ATTORNEY

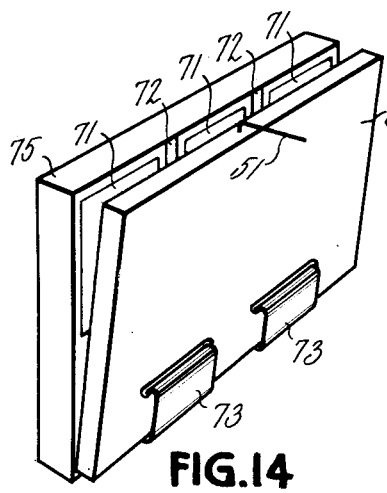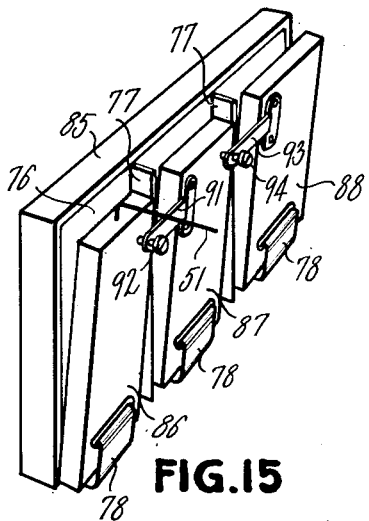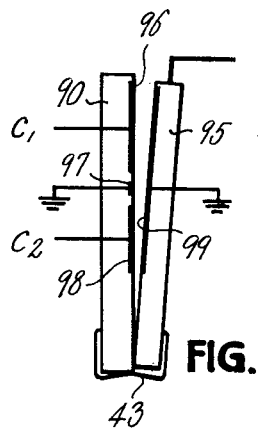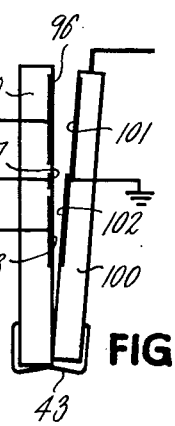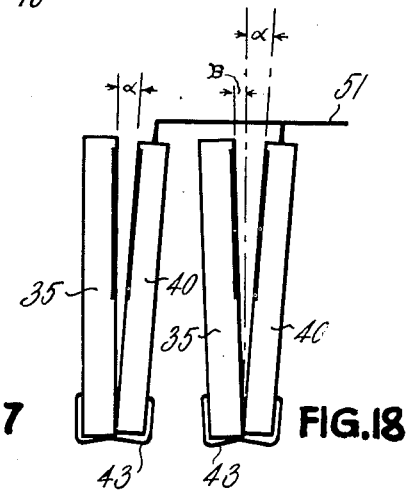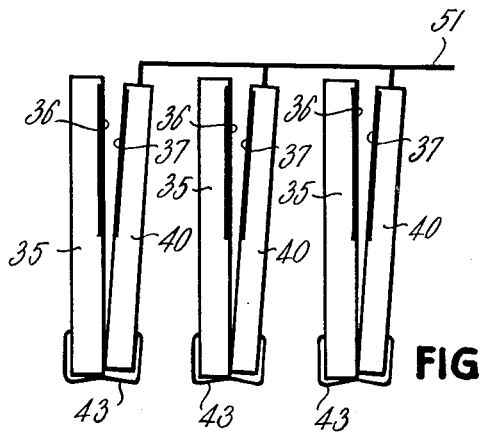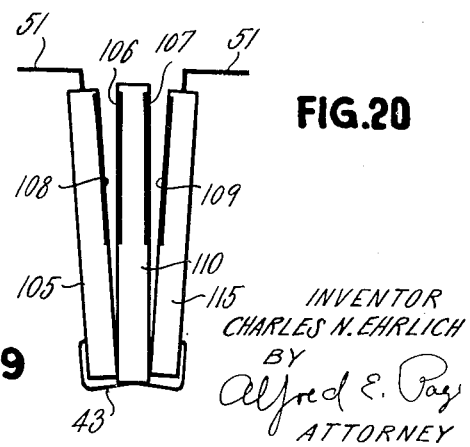

March 18, 1952 C. N. EHRLICH 2,589,351
VARIABLE CONDENSER

Filed Feb. 27, 1947 6 Sheets-Sheet 4

INVENTOR
CHARLES N. EHRLICH
BY
Alfred E. Page
ATTORNEY

March 18, 1952     C. N. EHRLICH     2,589,351
VARIABLE CONDENSER

Filed Feb. 27, 1947     6 Sheets-Sheet 5

INVENTOR
CHARLES N. EHRLICH
BY
Alfred E. Page
ATTORNEY

March 18, 1952     C. N. EHRLICH     2,589,351
VARIABLE CONDENSER

Filed Feb. 27, 1947     6 Sheets-Sheet 6

INVENTOR
CHARLES N. EHRLICH
BY
Alfred E. Page
ATTORNEY

Patented Mar. 18, 1952

2,589,351

UNITED STATES PATENT OFFICE 2,589,351

VARIABLE CONDENSER

Charles N. Ehrlich, New York, N. Y.

Application February 27, 1947, Serial No. 731,229

15 Claims. (Cl. 175—41.5)

1

The invention relates to a novel variable condenser of the type generally used for the tuning of resonant circuits in electronic apparatus.

The capacity of a condenser is determined by the active surface of the electrodes, the gap between the electrodes, and the dielectric constant of the medium filling the gap. By changing one or more of these three parameters, the capacity of a condenser is changed. In variable condensers for industrial use, means are provided to perform and control this change in a predetermined and repeatable way. It is desirable to prevent changes of any one of these three parameters due to mechanical influences in general, shock, vibration, or variations of ambient conditions, such as temperature, humidity, etc., or at least to keep such undesired changes as small as possible.

Known variable condensers mostly use complex mechanical structures to form the electrodes which are subject to dimensional changes under the above mentioned influences. The relative position of the electrodes, and correspondingly their active surfaces and the gap between them, are controlled by mechanical arrangements of questionable rigidity.

As a result, most known variable condensers change their capacity considerably under the above mentioned stresses or variations of operating conditions, all of which are nearly always encountered under practical working conditions. Microphony, resulting from capacity fluctuations caused by mechanical vibration, is one of the most undesired of these changes.

In order to keep these unwanted changes small, most known variable condensers have to be built with relatively large electrode surfaces and relatively large gaps between the electrodes. Large overall dimensions result, with long leads required to connect most known variable condensers with adjacent components of the circuit, and instability due to stray coupling occurs.

Furthermore, inductive components are thus introduced into the impedance of the condenser and, especially on higher frequencies, are not negligible.

In order to overcome some of these difficulties, variable condensers have been built using mediums with a high dielectric constant in the gap between the electrodes. Besides other defects, the field of application of these latter condensers is limited due to losses higher than those obtainable by using the best known dielectric material, i. e. air.

Other attempts have been made to solve these problems. For example, in U. S. Patent No. 2,046,803, it has been proposed to construct a condenser comprising pairs of relatively movable rigid plates, which are moved toward and away from each other by cam arrangements. The plates remain parallel and, to accomplish this, a complex operating structure is provided. Thus, the reduction of unwanted variations effected by the use of rigid plates is seriously mitigated by the variations in capacity caused by effects on the operating structure controlling the gap between the electrodes.

Other variable condensers have been built comprising one rigid and one flexible plate. They have the advantage of small size relative to the maximum obtainable capacity and are of low cost. The flexible plate, being under constant stress, deforms with time and changes of temperature, in turn causing undesired changes of capacity. Furthermore, it is impossible to obtain capacity characteristics which follow a predetermined pattern within tolerable limits. The field of application for these types of variable condensers remains therefore limited to adjustable condensers, usually referred to in the art as "trimmers."

In order to obtain padding effects, such as for example required in multiple gang condensers for superheterodyne receivers, known variable condensers use specially "cut" plates, or separate padding condensers are provided in the circuit.

Last, but not least, the movement of the controls operating known variable condensers have limitations, which usually have to be overcome by drive mechanisms.

It is among the objects of this invention to provide an efficient, compact, and stable variable condenser; to provide such a condenser including rigid members, having electrically conductive surfaces constituting electrodes, and adjustably interrelated in an inherently structurally stable relation; to provide a variable condenser comprising hingedly interrelated rigid plates having electrically conductive surfaces forming condenser electrodes, including means defining the position of the hinge line therebetween and means for varying the opening between the plates to vary the condenser capacity; to provide such a condenser including means normally urging the plates together and preventing uncontrolled shifting of the hinge line, and adjustable means for varying the opening between the plates; to provide such a condenser in which one or more of the plates may be provided with electrode areas of equal or different values; to provide a tuning unit including one or more of such condensers connected for operation as a unit; to provide a variable condenser comprising an inner and outer plates, with electrode surfaces on both faces of the inner plate and on the juxtaposed faces of the outer plates; to provide a condenser comprising a pair of hingedly interrelated rigid plates having cooperating electrode surfaces, cooperating cam means on the two plates effective accurately to vary the opening therebetween, a plurality of means for operating said cam means, and a selector mechanism for conditioning said cam means for operation by a selected one of the operating means; to provide a unit including such condenser and "trimmer" condensers mounted therewith and having one electrode in common with one of the variable condenser electrodes; to provide such a condenser including a slide movable along one plate and a link pivotally interconnecting said slide and the other plate to control the opening between the plates to vary the capacity of the condenser; and in general to provide a variable condenser, electronic tuning unit which is novel, compact, inexpensive, efficient and reliable under operating conditions.

These, and other objects, advantages and novel features of the invention will be apparent from the following description and the accompanying drawings.

In the drawings:

Figs. 1 through 3 are diagrams illustrating the theory of operation of the invention condenser.

Figs. 4 and 5 are sets of curves graphically setting forth the relation between factors of the invention condenser.

Figs. 6 and 7 are front elevational and side elevation views, respectively, of one embodiment which the condenser may assume in practice.

Figs. 8, 9 and 10 are front elevation, side elevation, and bottom plan views, respectively, of another practical embodiment of the invention.

Figs. 11, 12 and 13 are views similar to Figs. 8, 9 and 10, respectively, of a further practical embodiment of the invention.

Figs. 14 and 15 are perspective views of multiple condensers embodying the principles of the invention.

Figs. 16 and 17 are somewhat diagrammatic side elevation views of other embodiments of multiple condensers according to the present invention.

Figs. 18 and 19 are side elevation views diagrammatically illustrating ganging arrangements for condensers embodying the present invention.

Fig. 20 is a side elevation view diagrammatically illustrating a further embodiment of the invention.

Figure 21:
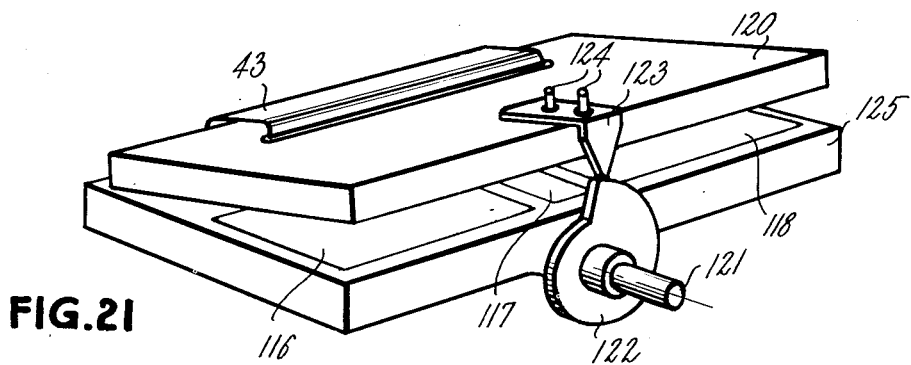
Figs. 21 and 22 are perspective views illustrating two types of operating means for accurately varying the capacity of a condenser constructed according to the invention, in a predetermined manner.

Generally speaking, according to the present invention, a variable condenser is provided comprising hingedly interrelated rigid plates having electrically conductive surfaces constituting condenser electrodes, and including means defining the hinge line between the plates and means for varying the capacity of the condenser.

The simplest condenser according to the present invention comprises a pair of rigid plates having electrically conductive surfaces forming the electrodes. The plates bear on each other at one end in a hinging relation, either directly or through the interposition of shims, or an insulating film. The operating means, which control the opening angle between the plates, are preferably located at the free or open ends of the plates, and preferably bear directly on the plates. As a result, a simple, structurally stable, rigid triangular structure is achieved, the plates forming two sides of the triangle and the third side of the triangle being formed by the operating means, which bear on the plates.

Thus a basic structure for a variable condenser is obtained which is rigid and stable under mechanical stress and variations of ambient conditions. Capacity characteristics can be obtioned, which follow a predetermined pattern within the closest limits. Employing essentially air as medium between the electrodes, losses are as low as governed by the quality of the dielectric used to insulate the electrodes. The simple and rigid structure of the electrodes permits to keep their mechanical dimensions uniform in production and stable under working conditions. The means used to locate and space the electrodes against each other are of utmost rigidity. The invention condenser is based on the principle of fixed active electrode surfaces and variable air gap between the electrodes. Thus the air gap increases with higher tuning frequencies.

The result is the possibility of using small electrode surfaces and small gaps for the highest tuning capacity, with resultant small overall dimensions and low inductive components in the overall impedance of the variable condenser, with microphony and similar defects greatly reduced, if not totally eliminated.

The possible arrangements to adjust the initial capacity simplify the task of uniform mass production with small tolerances, providing, in addition, for the attainment of any required padding effect in the simplest possible way. The movements of the controls operating the invention condenser are varied and can be made to suit the application.

The principles of operation will be understood best by reference to Figs. 1 through 5, which diagrammatically and graphically illustrate the theory of the invention. Reference to Fig. 1, which represents a schematic cross-section of a condenser element according to the invention, a pair of rigid plate electrodes 31 and 32 are provided. $a$ designates the opening angle between the electrodes and $G_2$ and $G_3$ represent fixed distances of the electrode planes from the hinge line 33 due to separation of the plates by shims, insulating films or the like.

By dividing the air gap of the condenser shown in Fig. 1 into three parts, the condenser of Fig. 1 can be substituted electrically by the arrangement shown in Fig. 2, which comprises two fixed parallel plate condensers $C''$ and $C'''$ with electrode separations $G_2$ and $G_3$, respectively, in series with a variable condenser $C'$ with a V-shaped gap and a variable opening angle $a$. In most of the practical executions of the invention condenser, the fixed separations $G_2$ and $G_3$ will be very small, and furthermore formed by mediums with a dielectric constant higher than 1. Therefore, the capacity of the condensers $C''$ and $C'''$ will be large compared to that of condenser $C'$. Knowledge of the behavior of condenser $C'$ alone will therefore be conclusive, in most cases, for the behavior of the total capacity. Otherwise it is simple to reintroduce the effect of the series condensers by using the formula $$\frac{1}{C} = \frac{1}{C'} + \frac{1}{C''} + \frac{1}{C'''}$$

Therefore, in the following mathematical treatment, the capacity $C'$, only, is analyzed, with reference to Fig. 3, which shows this simplified invention condenser diagrammatically.

In order to calculate the capacity of the unit of Fig. 3, a factor must be found which takes into consideration the inclination of the electrode surfaces to each other and the corresponding changing magnitude of the air gap. The equation for the capacity of the condenser may be written as follows:

(1) $$C' = K \frac{A}{G_{equ}}$$

$C'$ = Capacity
$K$ = Constant
$A$ = Area of electrode surfaces
$G_{equ}$ = Gap of an equivalent parallel plate condenser with the same electrode surface and the same capacity.

For a condenser with a V-shaped dielectric gap but having a very narrow electrode $dx$ the formulae for parallel plate condensers can be applied as follows:

(2) $$dC' = K \frac{dA}{E}$$

wherein $D$ = Depth of electrode surfaces
$A = (1-L)RD$
$dA = dxD$
$$E = \frac{Gx}{R}$$
$L$ = Percent of inactive width of $R$
$G$ = Gap between electrodes measured on the edge farthest from hinge line
$E$ = gap between electrodes measured at the position $dX$
$R$ = distance between hinge line and the edge farthest from hinge line Substituting these values in the two formulae above, the following equations are obtained:

(3) $$C' = (1-L)RDK\frac{1}{G_{equ}}$$

(4) $$dC' = RDK\frac{1}{G}\frac{dx}{x}$$

(5) $$RDK\frac{1}{G}\int_{LR}^{R}\frac{dx}{x} = RDK\frac{1}{G}(\log_e R - \log_e LR)$$

(6) $$= RDK\frac{1}{G}(-\log_e L)$$

(7) $$(1-L)RDK\frac{1}{G_{equ}} = RDK\frac{1}{G}(-\log_e L)$$

(8) $$G_{equ} = G\frac{(1-L)}{(-\log_e L)}$$

As shown in Fig. 3, $G_s$ is the gap between the electrodes measured on the edge closest to the hinge line. It is desirable to obtain the required capacity range while keeping $G_s$ as large as possible. With a fixed total width $R$, the gap changes with $L$ as a parameter. This may be expressed as follows:

(9) $$G_s = LG$$

The following relations then apply:

(10) $$C' = K\frac{A}{G_{equ}}$$

(11) $$= K\frac{(1-L)RD(-\log_e L)}{G(1-L)}$$

(12) $$= KRD\frac{L(-\log_e L)}{G_s} = \text{Constant}$$

If $R$ and $D$ remain constant, the following results are obtained:

(13) $$G_s = \text{Constant } xL(\log_e L)$$

(14) $$\frac{dG_s}{dL} = 0 = \frac{dL}{dL}\log_e L + L\frac{d\log_e L}{dL}$$

(15) $$= \log_e L + 1 = 0$$

(16) $$\log_e L = -1$$

(17) $$L = .368$$

It will thus be seen that by leaving approximately 37% of the total width of the plate inactive, $G_s$ reaches a maximum. In Fig. 4 the curve for Z represents the relation of $G_{equ}$ to $G$ with $L$ as a parameter. The curve Y of Fig. 4 shows the relation of $G_s$ to $G_{s\ max}$ with $L$ as a parameter, wherein $G_{s\ max}$ sepresents the value of $G_s$ of $L = .368$ (see Equation 17). In order to obtain the maximum variation in the capacity of the condenser for a given variation of the air gap (G) it is advisable to use an inactive length (L) slightly higher than the optimum, i. e., around 40%. This reduces the minimum capacity of the condenser slightly while still keeping $G_s$ close to the optimum value. However, depending upon the particular application, values of $L$ from 30% to 60% may be used.

Fig. 5 shows the capacity variation with the gap G as a parameter. If the gap is varied linearly, the capacity decreases very rapidly, as may be noted from the steep slope of the curve A. Such a rapid initial change in the condenser capacity in response to linear movement of a control is undesirable in practice. Accordingly, it is preferred to use a type of control in which the variation of the gap is non-linear with respect to linear movement of the control.

For example, a sliding cam may have a circular shaped surface en~aged by a cam follower. However, the same effect may be attained by using a stationary circular cam surface and a cam follower mounted on a slide. Alternatively, the same effect may be achieved by a slide movable along one plate and pivotally interconnected with the other plate by a link. With either arrangement, the variation in condenser capacity for linear movement of the sliding element is shown by the curve B, which has a much gentler slope than the curve A. Curve B is based on using 45° of a circle as a useful cam surface or using a link turning 45°.

The theory of the invention condenser having been set forth, the following description will relate to possible embodiments of the invention condenser. In this description, it should be borne in mind that Figs. 6 through 13 illustrate basic units embodying the invention principles, including details of various forms which the plates may assume, and various arrangements for hingedly interrelating the plates. Figs. 14 through 20 illustrate various arrangements for forming multiple or ganged condensers embodying the invention, and means for achieving padding effects. Figs. 21 through 30 illustrate means for varying the capacity of the condenser in a predetermined manner, and arrangements incorporating trimmer condensers. In particular, Figs. 24 through 30 illustrate a practical embodiment of the invention, comprising a fully enclosed, two-gang variable condenser for industrial use.

As stated, basically the invention condenser comprises hingedly interrelated rigid plates having electrically conductive surfaces forming electrodes, means defining the hinge line with reference to these plates, and means operative to vary the angle between the plates to vary the capacity of the condenser. Figs. 6 through 13 illustrate varied embodiments the plates themselves may assume, and typical examples of means to define the hinge line. In these figures, the means to vary the angle between the plates are schematically indicated by a link 51, and will be described later in detail.

The rigid plates of the invention condenser may be made of dielectric material, or of metal, or of combinations thereof. Suitable dielectric materials are glass, ceramic, or the like. The electrically conductive surfaces on dielectric plates may be formed by metal deposited by any known process, such as, for example, electroplating, metal spraying, or processes for depositing metal by heat or by chemical separation. Metal plates may have a homogeneous structure or may be formed by layers of different metals, rolled together or otherwise joined permanently. They may have surface deposits of other metals, in order to improve the electrical conductivity or the corrosion resistance of the surface, such as for example brass plates with silver-plated surfaces.

Composite plates may be formed by any known process, such as for example molded dielectric plates with metal inserts, or using composite plates, such as available in the trade, consisting of dielectric sheets glued together with metal sheets. The electrically conductive surfaces, or any other parts of the plates, may be covered with an insulating film or a film to protect the electrically conductive surfaces or any other part of the plates against corrosion or humidity, and this film may be deposited by any known process, such as dipping, spraying, glueing or the like. This film may serve the purpose of insulation and protection at the same time.

In the following description and the drawings, particular executions of the plates are mentioned and illustrated. However, it should be understood that this is by way of illustration only, and that any one of the above mentioned executions of the rigid plates and conductive surfaces may be used in any one of the embodiments, if it is found practical for the particular embodiment. Also, while the rigid plates are generally shown as bearing on each other directly, it should be understood that, while this is a preferred execution, in any one of the embodiments, a shim or a dielectric sheet may be interposed between the plates.

Furthermore, wherever a dielectric plate with metal deposits forming electrodes is described or shown, it should be understood that, in order to compensate for the thickness of the metal deposit of the electrodes, a similar deposit may be provided at the surface forming part of the hinge, in order to achieve that the electrode planes are situated in the hinge line, as shown diagrammatically in Fig. 3, and that these metal deposits may be electrically connected with the electrodes or may be insulated from them.

Additionally, while the drawings generally show both electrodes forming one capacity as being of the same size, in order to facilitate the description, in most practical executions the "hot" electrode surface is smaller and is the one which determines the active electrode surface and thus the capacity, whereas the "cold" electrode is larger, and acts preferably as an electrostatic shield. It is therefore understood, that this shielding effect may be provided in any one of the described embodiments, even if not shown in the drawing or particularly mentioned in the description.

Also, the cooperative electrically conductive surfaces forming the electrodes of one capacity are always shown as facing each other. This is not done to limit the scope of the invention to this particular execution but merely to simplify the illustrations. Wherever dielectric material is used to form the rigid plates, the electrically conductive surfaces of one or both plates may be located on the other side of the plate. In such case, the dielectric material of one or both plates becomes part of the medium filling the gap between the electrodes. This may have advantages for certain executions of the condenser of the invention, such as, for example, for purposes of temperature compensation by using dielectric material to form the plates with the dielectric material having a defined temperature coefficient. Furthermore, it should be understood that though plates and electrodes are shown square as a preferred execution of the invention, they may take any suitable shape.

Figs. 6 and 7 show a typical embodiment of the condenser of the invention. Though any one or combinations of the above mentioned possible plate and electrode executions could be used, Figs. 6 and 7 show rigid plates 35 and 40 of dielectric material having metal deposits 36 and 37 forming electrodes. Lug terminals 38 and 41 are in electrical contact with the electrodes and serve as external connectors. Round holes in the plates provide clearance for the heads of the terminal lugs. A sheet 99 of insulating material, such as, for example, mica, covers plate 40 and has holes to clear the eyelets of the terminal lugs and balls 50. Plates 35 and 40 are hingedly interrelated relative to each other about a substantially fixed hinge line 33, and are held in engagement by a U-shaped spring 43 having its free ends set in recesses 44 and 46 of the plates.

Shifting of the hinge line with relation to any one of the plates is controlled by forming each plate with a pair of aligned recesses 47 and 48 which jointly receive bearing balls 50. The recesses 47 in plate 35 are formed with converging rectilinear sides forming wedges pointing away from the hinge line. The remaining portion of the recess may have any shape as long as it clears the ball. In the illustration, it is circular. In plate 40, the right-hand recess 48 (Fig. 6) is likewise formed with a wedge, but this wedge points toward the hinge line. The left-hand recess 48 has to have a shape to allow for manufacturing tolerances. In the illustration, it is substantially rectangular. The recesses have a depth at least equal to the radius of balls 50.

When balls 50 are engaged in the recesses and spring 43 is secured to the plates, the bight 39 of the spring bears against plate 40 and resiliently urges plate 35 toward the hinge line. This forces the balls 50 into the wedge portions of recesses 47 and 48, causing the V-shaped edge of recess 47 to slide along the surface of ball 50 in a counter-clockwise direction during opening of the condenser, and clockwise during closing. Thus, shifting of hinge line 33 along plate 40 is effectively controlled or limited by such engagement of the recess edge and the ball surface. The shape of the recesses may be clearly seen in Figs. 29 and 30 which show perspective views of similar plates with such recesses. In order to understand fully this locking arrangement, it should be borne in mind that, in practical embodiments of the condenser, the angle between the plates never assumes a greater value than approximately 5°.

Figs. 8, 9 and 10 show another embodiment of the invention. Though any one or combinations of the above mentioned possible executions for the plates and electrodes may be used, Figs. 8, 9 and 10 show a plate 45 of rigid dielectric material having a metal deposit 37 forming an electrode which is electrically connected to the terminal lug 41. Two pins 52 are riveted to plate 45 and a terminal lug 42 is secured to the right-hand pin (see Fig. 10). Plate 55 is made of metal and has one pin 57 secured to it. This plate is formed with an aperture to clear the head of lug 41 and with two recesses, one with a V-notch 53 and the other with a straight edge 49. The pins 52 and 57 have annular grooves. A U-shaped wire spring 58 has a center part which is straight prior to assembly. When this straight part of spring 58 is forced to engage the annular grooves of the three pins, as shown, the parts are so dimensioned that the spring is bent and, with its mounting tension, resiliently urges plate 55, through pin 57, toward plate 45 and against pins 52. This forces the plates to bear against each other at the hinge line 33 and locks them securely against unwanted, substantially parallel shifting relative to each other, thus maintaining the position of the hinge line relatively to both plates.

Though the angle between plates 45 and 55 never assumes a value larger than approximately 5° in practice, pins 52 are shown with a curved shape at the surfaces touching edges 53 and 49 of plate 55 and are at different distances from the outer edge of plate 45 in order to prevent hinge line 33 shifting too much relative to plate 45 for different opening angles of the embodiment. But these details are not essential, as it is sufficient, for the purpose of the invention, that the hinge line is defined for a certain opening angle of the unit, and it may assume another position for a different opening angle, as long as this shifting is controlled and retraced. The surface of the metal plate 55 acts as the second electrode of the condenser and, by means of pin 57, spring 58 and pin 52 is electrically connected to terminal lug 42. Thus spring 58 acts simultaneously as an electrical conductor.

Figs. 11, 12 and 13 illustrate another embodiment of the means to control the position of the hinge line relative to both plates, and also a special embodiment of a rigid plate. Here only plate 60 may assume any one of the above mentioned executions and en electrode may be provided for plate 60 according to any one of the above mentioned executions. In the illustrated embodiment plate 60 is made of metal and serves as one electrode. A leaf spring 62 is secured to plate 60 by means of two eyelets 61 one of which is provided with a terminal lug 64. Leaf spring 62 is likewise secured by eyelets 63 to a rigid plate 65 of dielectric material. Plate 65 is recessed, as at 69 and these recesses have a depth greater than the thickness of spring 62 so that the latter resiliently biases the plates into engagement at the hinge line 33 by the mounting tension.

Plate 65 is further recessed as at 66 and has eyelets 67 secured near its outer edge, one of these having a terminal lug 68 secured to it. Plate 70 is made of metal and serves as the other electrode. Two metal pins 59 are secured to plate 70. In order to provide, in such a composite plate, a predetermined relation between the surface which serves as an electrode and the hinge line, plates 65 and 70 are lined up, for example, in a jig, and then permanently joined by soldering pins 59 to eyelets 67. The plates are held against shifting substantially parallel to each other by the lateral stiffness of leaf spring 62.

Figs. 14 through 20 illustrate various arrangements of multiple or gang condensers embodying the invention, and also means to achieve padding effects. The condenser arrangements shown in Figs. 14 through 30 use the plate constructions and hinge line controlling arrangements described in connection with Figs. 6 and 7. This has been done to simplify the description, but should not be taken to limit these embodiments to these particular details. It should be clearly understood that any of the condenser embodiments described hereinafter may incorporate any combination of the detailed arrangements or constructions described above.

Fig. 14 shows a three gang condenser embodying the invention, but any plurality of capacities may be constructed in a similar manner. A rigid dielectric plate 75 is provided with three electrically conductive surfaces 71 forming electrodes. Two preferably grounded electrically conductive surface strips 72 shield the electrodes electrostatically from each other in a known manner. Plate 80 may be made of metal, in which case its surface facing plate 75 constitutes the other electrode common to the three capacities, or it may be of dielectric material and have the same arrangement of electrodes as plate 75. Means defining the hinge line relative to plates 75 and 80 are the same as in Figs. 6 and 7, but only springs 73 are shown, corresponding to spring 43 of Figs. 6 and 7. Shields 72 may be omitted wherever shielding between juxtaposed capacities is not required. The means to vary the capacity of the condenser are indicated schematically by a link 51.

Fig. 15 shows another embodiment of a multiple condenser according to the invention. As shown, a rigid plate 85 has an electrically conductive surface 76 with shields 77 connected to its mechanically and electrically. Rigid plates 86, 87 and 88 of dielectric material have electrically conductive surfaces not visible in the illustration. Means defining the hinge lines relative to the plates are again the same as in Figs. 6 and 7, and springs 78 correspond to spring 43. An arm 93 extends from plate 88 and has an adjustment screw 94 engaging plate 87. Similarly, an arm 91 secured to plate 87 is provided with an adjustment screw 92 engaging the plate 86, which has means to vary the capacity attached to it, represented schematically by link 51. The initial capacity of each unit can therefore be adjusted individually. As the operating means indicated by link 51 are common, condenser elements with equal electrode arrangements can be adjusted in such a way that they appear as having identical capacity characteristics, but with one or more of them being in series with a fixed condenser. Therefore, by simply adjusting the initial gaps to different values, any desired padding or series condenser effect may be achieved.

It is within the scope of the invention to use any plurality of second plates, and to have one or more electrodes provided on each second plate and thus provide one or more individual capacities for each second plate. Shields 77 can be omitted if shielding of juxtaposed units is not required or can be replaced by other shielding arrangements, such as, for example, that shown in Fig. 14.

Figs. 16 through 20 illustrate, somewhat diagrammatically, various condenser arrangements which may be formed with the present invention. In each instance, the plates are held in engagement by a U-shaped spring 43, which forms part of the hinge line control arrangement previously described. For purposes of illustration, the rigid plates are all shown as consisting of dielectric material having electrically conductive surfaces.

Fig. 16 illustrates another embodiment of a multiple condenser according to the invention. Though shown here for two individual capacities, the same principle may be applied to any desired plurality of capacities. Plate 90 has two electrically conductive surfaces 96 and 98 which, cooperating with electrode 99 of plate 95, form two capacities $C_1$ and $C_2$. A preferably grounded strip 97 may be provided to act as an electrostatic shield as previously described. The condensers $C_1$ and $C_2$ can be dimensioned to have identical capacity curves, for example by keeping the values L and D, of Fig. 3 and the associated description, the same for condensers $C_1$ and $C_2$.

In Fig. 17, an arrangement is shown which is similar to Fig. 16. The only difference is that plate 95 is replaced by a plate 100 having its electrode surface stepped. Comparing the two figures, electrode 102 of condenser $C_2$ has the same position with respect to electrode 98 as electrode 99 has in Fig. 16. However, electrode surface 101 is stepped back with the effect of an increased gap. Therefore, capacity $C_3$ will have a characteristic equal to an arrangement of a condenser $C_1$ in series with a parallel plate condenser of electrode surface 96 and gap equal to the step between surfaces 102 and 101. Thus a padding effect is obtained.

Fig. 18 shows a pair of condensers, each identical to that shown in Figs. 6 and 7, in which the plates 40 are schematically indicated as interconnected by link 51 for gang operation. By adjusting the position of one plate 35, both pairs of plates may have the same opening angle, and thus the same capacity characteristic. Alternatively, and as indicated in the illustration, one pair may be adjusted to a variable opening angle $\alpha$ and the other pair of plates to the fixed angle $\beta$ plus the same variable opening angle $\alpha$. Thus again a series condenser effect may be achieved.

Fig. 19 shows a three gang condenser based on the same principle as the two gang condenser shown in Fig. 18, and including cooperating electrode pairs 36 and 37.

Fig. 20 schematically shows another embodiment of the invention comprising three rigid plates 105, 110 and 115 shown, for example, as formed of dielectric material, held in engagement and controlled as to shifting of the hinge lines by arrangements as previously described and here indicated by spring 43. Inner plate 110 is provided with electrically conductive surfaces 106 and 107 forming electrodes on each face of plate 110. Outer plates 105 and 115 are formed with electrically conductive surfaces constituting electrodes 108 and 109 cooperative respectively with electrodes 106 and 107. Links 51 are schematically indicated as each connected to one of the plates 105, 115, illustrating suitable means, such as cams or the like, for swinging the outer plates with respect to the inner plates. Examples of such operating means are given hereinafter.

It should be understood further that the arrangements of Figs. 14 and 20 may be combined to form multiple condensers, as for example by providing two plates 80 of Fig. 14 on each side of plate 75 in order to combine the principle of this arrangement with that of Fig. 20.

Having described basic embodiments of the invention condenser, means for varying the condenser opening angle will now be described with particular reference to Figs. 21 through 30. Generally speaking, a suitable means could be provided by using, for example, a plate arrangement as shown in Figs. 6 and 7, and providing a thread in plate 40 engaging a screw which bears against plate 35. Spring 43 would try to force the plates against each other, whereas the screw would force them apart. By turning the screw, the angle between the plates would change and herewith the capacity. This arrangement is very often used for adjustable condensers, like trimmers. The capacity characteristic of such an arrangement would follow a curve corresponding to curve A of Fig. 5, the screw changing the gap in linear relation to its rotation. In order to shape the characteristic to suit applications like tuning condensers in radio receivers, curve A would be unsuitable. By replacing the above mentioned screw with one with variable pitch, more specifically referred to in the art as a hight cam, any desired characteristic can be obtained.

Fig. 21 shows an arrangement using a rotary radial cam, an embodiment which would be more suitable for production purposes than a hight cam. As shown, the condenser in this instance likewise comprises a pair of rigid plates 120 and 125, hingedly interconnected and controlled as to shifting of the hinge line by means as shown in Figs. 6 and 7 and here illustrated by spring 43. In the particular arrangement shown, plate 125 is shown as made of dielectric material having electrically conductive surfaces 116 and 118 constituting electrodes and a strip 117 which may serve as an electrostatic shield as previously described. Plate 120 has metal pins 124, 124 secured to it.

A shaft 121 is rotatably mounted in any suitable position on plate 125, being illustrated, for example, as projecting from the forward edge of the plate. This shaft has secured thereto a cam 122 of a design suitable to give the required variation of opening between the plates and thus the desired capacity characteristic of the unit. A cam follower 123 secured in fixed relation to plate 120 engages cam 122, so that rotation of the latter will adjust the opening between the plates and thus vary the capacity of the condenser. In order accurately to set cam follower 123 with respect to a fixed point on cam 122 and to adjust the capacity to the predetermined value of this cam position, cam follower 123 is preferably soldered to pins 124 and thus fastened rigidly to plate 120. This permits setting of the parts in their predetermined position in an easy and accurate way, for example by means of a jig, and holding them there while performing the above mentioned securing operation.

Figure 22:
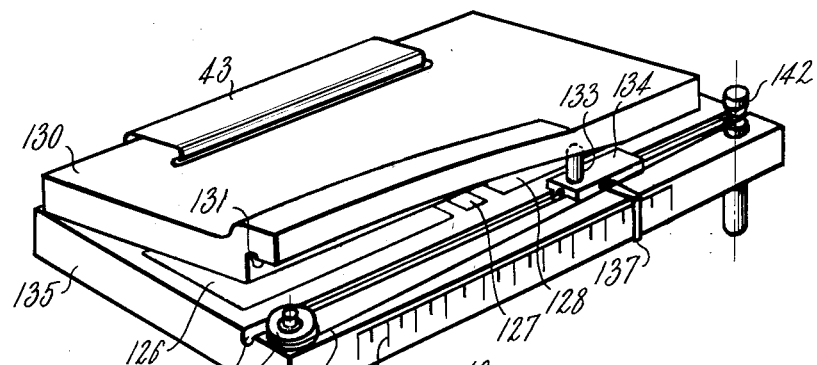

Fig. 22 illustrates another arrangement for varying the capacity of the condenser by cam means. Plate 135 has electrically conductive surfaces 126 and 128 constituting electrodes and an electrostatic shield 127 may be provided as previously described. A slide 134 is movable along plate 135 and guided by a groove 136. Slide 134 may have an indicator 137 fastened to it, which cooperates with a scale 139. The slide operating means comprises a cord or cable 141 engaging a grooved control shaft 142 and extending around a pulley 143. A second rigid plate 130 is shaped to form a cam surface 131. Plates 130 and 135 are held in hinging relation with means similar to those of Figs. 6 and 7, represented here by spring 43.

Secured to slide 134 is a cam follower 133 engaging cam surface 131. Rotation of shaft 142 moves the slide, changing the separation of the plates and thus the capacity of the unit. As previously described, the cam follower may be secured to the slide by means of soldering in order to have cam follower 133 engage cam 131 at a predetermined point for a predetermined position of slide 134, and to set the capacity for this slide position to a predetermined value.

In order to obtain capacity characteristics within usable tolerances, cam 122 of Fig. 21 and cam 131 of Fig. 22 have to be ground to narrow tolerance specifications. In order to simplify this grinding process, it would be desirable to have, for example, cam surface 131 in Fig. 22 form part of a circle. This would change the grinding operation from a shape grinding to a standard internal grinding operation. Assuming, for example, that cam 131 in Fig. 22 forms a 45° arc or 1/8 of a full circle, the capacity curve would follow curve B of Fig. 5. This brings the slide travel and the separation of the plates into a fixed relation which is not always acceptable in practical executions.

By introducing another nonlinear means, a mechanism is obtained which might look complicated but in practice is simple and offers valuable flexibility in designing means to operate the condenser to suit the application. Therefore, one of the preferred embodiments of the operating means of the condenser of the invention uses two nonlinear means in series with each other, the first means, which acts directly on the plates, being a cam with a surface which is part of a circle, and the second means being a rotary cam which operates the first cam.

With reference to Fig. 22, and using this principle therein, the cam surface 131 would be part of a circle, and slide 134 would be operated by a rotary cam. The requirements for this rotary cam from the point of view of precision are not very high due to the fact that cam 131 and slide 134 magnify the movement of plates 130 and 135 relative to each other to such an extent that, for example, in one typical practical embodiment, slide 134 moves on the high capacity end of the characteristic; that is, for close spacing of the electrodes, one hundred times faster than the plates move against each other. This means that, for example, a tolerance requirement of plus or minus .0001 inch on the spacing of the electrodes could be met by a tolerance of plus or minus .01 inch on the rotary cam.

Figure 23:
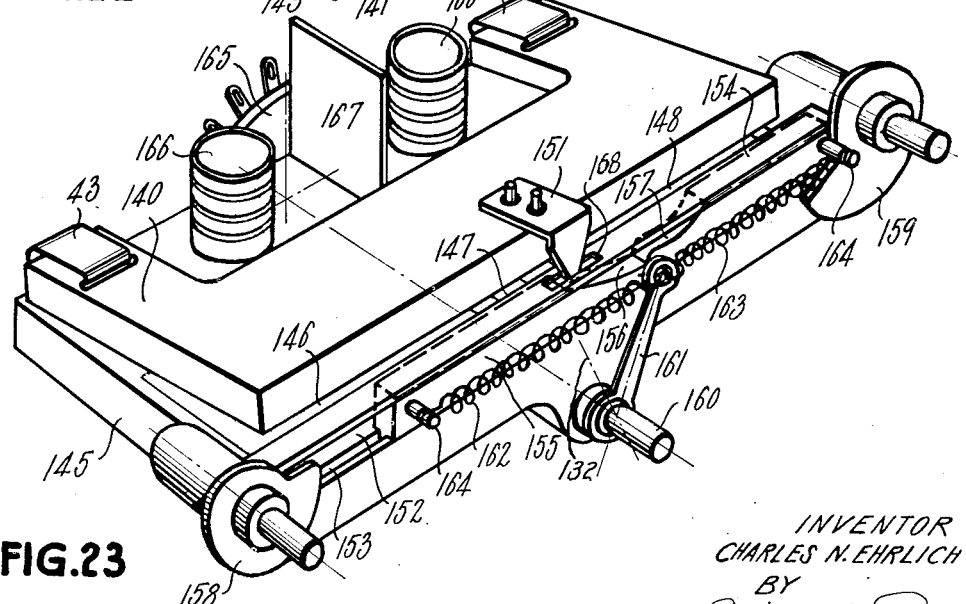
Fig. 23 is a perspective view of a selective electronic tuning unit incorporating a condenser according to the present invention.
Figure 25:
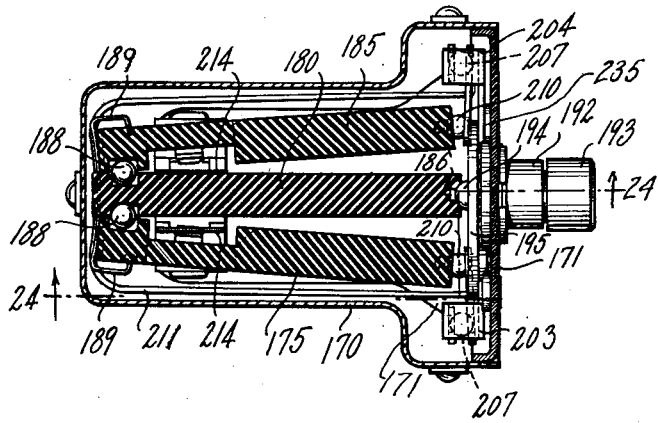
Fig. 25 is a transverse sectional view on the line 25—25 of Fig. 24 looking in the direction of the arrows.
Figure 24:
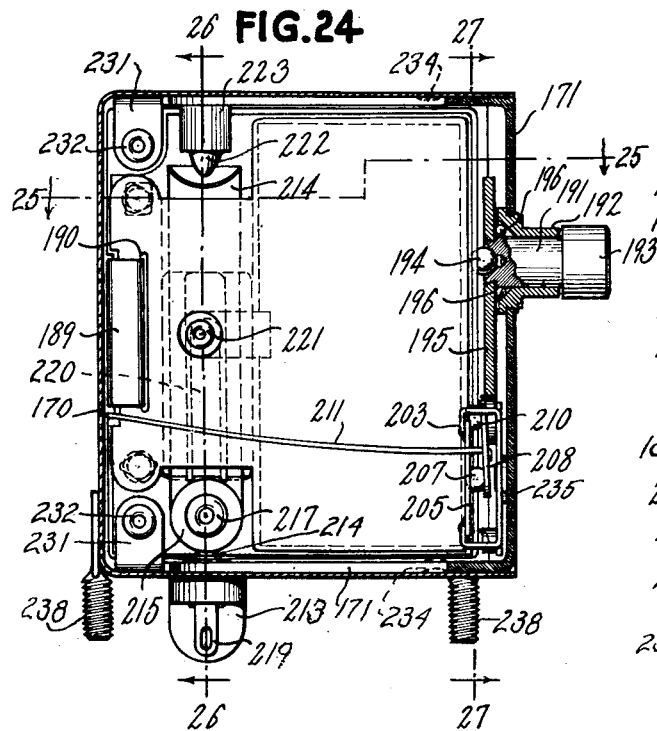
Fig. 24 is a sectional elevation view, of a practical condenser construction embodying the invention, on the line 24—24 of Fig. 25, looking in the direction of the arrows, with certain parts shown in elevation.
Figure 26:
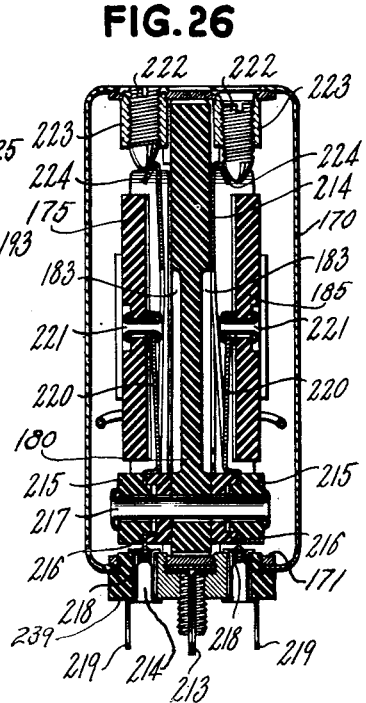
Fig. 26 is a vertical sectional view on the line 26—26 of Fig. 24, looking in the direction of the arrows.

The same effect can be achieved with a cam follower fastened to one plate and the circular cam being part of the slide. Such an execution is shown in Fig. 23. In order to keep the number of figures at a minimum, the embodiment of Fig. 23 incorporates at the same time other features of the invention. Fig. 23 illustrates how the invention condenser may be incorporated into a complete selective tuning unit of the type, for example, whereby a radio set may be selectively operated on any one of a number of preselected wave bands. Such units may be used, for instance, to preset a radio receiver for operation either on the standard broadcast band or on the short-wave band. The arrangement shown in Fig. 23 is typical only of the principles involved and may assume other forms in practice.

As shown, it comprises a condenser formed of rigid plates 140 and 145 which may be any of the types previously described. Plate 140 is illustrated as having a U-shape. Plate 145 is illustrated as having electrically conductive surfaces 146 and 148 which cooperate with surfaces of plate 140 to form variable capacities. Strip 147 may act as an electrostatic shield as previously described. A pair of U-shaped springs 43, 43 maintain the plates in hinging relation and help to control shifting of the hinge line, also as previously described. Plate 140 is provided with a cam follower 151, secured thereto by soldering for initial adjustment purposes as described in connection with Fig. 21.

Plate 145 is formed with a surface 152 having a groove 153. A slide 155 is movable along the surface 152, having a tongue fitting in groove 153. Slide 155 is formed with two cam surfaces 156 and 157, differing in profile. An upper guide 154 fastened to plate 145 or any pertinent part maintains slide 155 against surface 152 and has an aperture 168 through which follower 151 projects to engage cam surfaces 156 or 157.

Mounted adjacent either end of the path of movement of slide 155 are a pair of rotatable cams 158 and 159 which are secured to shafts, acting or being connected with tuning controls. Slide 155 is biased into engagement with either of cams 158 or 159 by rotation of a selector shaft 160 having an arm 161 connected by springs 162, 163 to pins 164, 164 at either end of slide 155. In the illustrated embodiment, the selector shaft 160 has been thrown to a position wherein it biases slide 155 to a position where the right-hand pin 164 engages cam 159, and cam follower 151 engages cam surface 156. Slide 155 is thus operated by cam 159. If shaft 160 is rotated in the opposite direction arm 161 assumes a position centered around 132 and slide 155 is biased to the left, wherein it is operated by cam 158 and cam follower 151 engages cam surface 157. Cam 158 might be, for example, connected with a short-wave tuning control, and cam 159 with a broadcast tuning control.

To complete the tuning unit, two sets of inductances 166, 166 are mounted on top of plate 145 between the arms of plate 149. Also mounted on the unit is a circuit selecting switch 165 which is operated by shaft 160 in shifting the control from one band of operation to the other. Preferably, a shield 167 is disposed between inductances 166.

It has been mentioned previously that a preferred execution of the condenser of the invention comprises a circular cam and a cam follower on a slide or a cam follower cooperating with a circular cam which forms part of a slide. In either one of these two preferred solutions the slide was operated by a rotary cam. The same action, and thus the attainment of a capacity curve B of Fig. 5 relative to the movement of the slide, can be obtained by connecting the slide by means of a link with the movable plate. Such an execution is shown in Figs. 24 through 30 illustrating a typical industrial embodiment of a two gang variable condenser according to the invention. This embodiment shows a typical example of how trimmers are incorporated with the condenser of the invention and how other problems of the prior art are solved.

Figure 27:
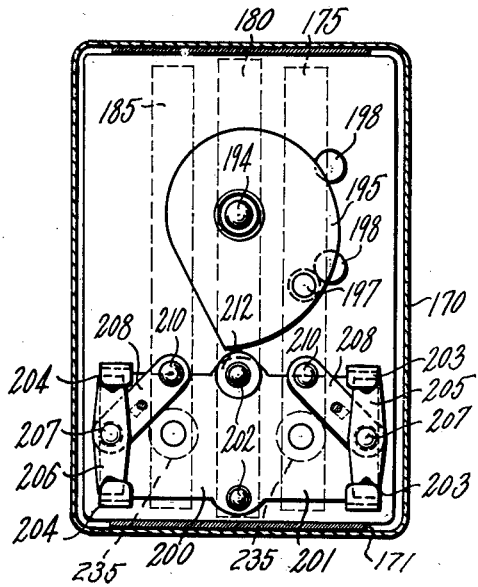
Fig. 27 is a sectional view on the line 27—27 of Fig. 24 looking in the direction of the arrows, and showing the condenser operating mechanism in one position.
Figure 28:
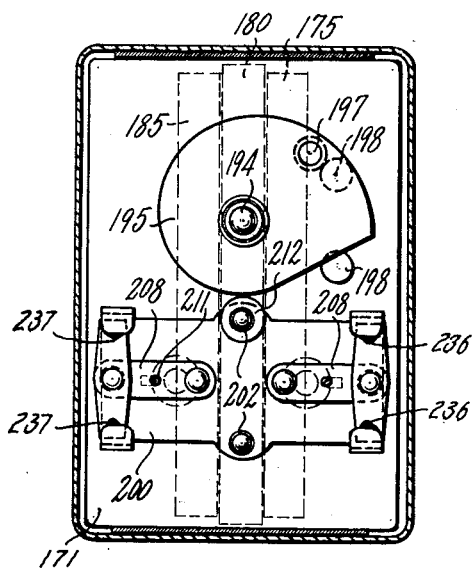
Fig. 28 is a view similar to Fig. 27 showing the operating mechanism in its opposite position.
Figures 29, 30:
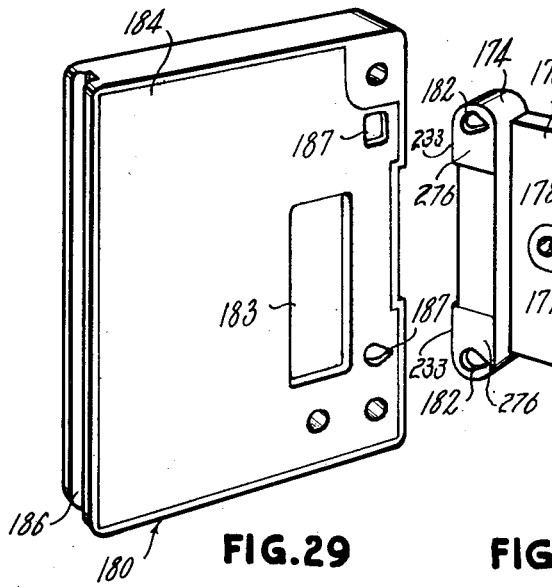
Fig. 29 is a perspective view of the inner plate of the unit shown in Figs. 24 through 28.
Fig. 30 is a perspective view of one of the outer plates of the unit.

In Figs. 24 through 30 the plate and electrode arrangement is the same as illustrated in a more schematic way in Fig. 20. In the embodiment shown, the three plates 175, 180 and 185 are made of rigid dielectric material. Side plate 185, which is a mirror copy of side plate 175, is shown in Fig. 30 as comprising a generally rectangular portion 172 joined by a reduced portion 173 to a cross arm 174, which has edges 233, 233 which form the hinge line of this plate. The surfaces of portion 172 and arm 174 are ground to be perfectly flat with relation to each other. The electrode is formed by a metal coating 176, and the same coating is applied to surfaces 276, 276, to maintain the ground flatness. Coating 176 is continued over a beveled surface 177 in order to connect electrically with a metal coated surface 178, which acts as terminal strip for the electrode as will be described later. Coating 176 being the electrode which determines the size of the active electrode surface of the condenser, it is important to keep its dimensions accurate. It can be readily understood that the edges of coating 176 can be ground to size, without injuring the connection to surface 178. The outer edge of plate 185 has a round, countersunk and ground recess 181 for a purpose to be described later.

Additionally, arm 174 is provided with recesses 182, 182, corresponding to recesses 47 of plate 35 in Figs. 6 and 7, and having a function as described for those.

Plate 180 is shown in Fig. 29 as being generally rectangular and formed with surface recesses 183. Both surfaces of plate 180 are ground flat and metal coated as indicated at 184. These metal coated electrically conductive surfaces are larger than the electrodes 176 of plates 175 and 185, and their size thereby does not determine the size of the active electrode surfaces of the condenser. The metal coating 184 extends into the recesses 183 for the purpose of forming an electrostatic shield between the two capacities of the condenser. The front edge of plate 180 is formed with a ground V-shaped groove 186 and near the rear edge recesses 187, 187 are provided corresponding with recesses 48, 48 of plate 40 in Figs. 6 and 7. Recesses 187, 187, cooperate with recesses 182, 182 of plates 175 and 185 to receive balls 188, 188 which act to control shifting movement of the hinge line as previously described in connection with Figs. 6 and 7. A U-shaped spring 189 resting with its center bend against plate 180 and with its free ends engaging shallow grooves 190 of plates 175 and 185, maintains the three plates in assembled relation, and assists in controlling shifting of the hinge line in the same manner as previously described.

A chassis 171 is provided, having a bushing 192 staked to it. A shaft 191 extends through the bushing 192, having on one side a cam 195 secured to it, and the other end 193 of the shaft serves as control to operate the condenser. A stop pin 197 on cam 195 is arranged to engage either of a pair of fixed abutments 198, 198 to limit rotation of the cam to 270°.

The chassis 171 extends to the back of the assembly, where it is formed with ears 231, 231. Plate 180 is secured to these ears by means of eyelets 232, 232, and blocked against play in the chassis near the forward edge by dimples 234, 234 of the chassis 171. In order to hold plate 180 centered and located with respect to shaft 191, a ball 194 engages in groove 186 of plate 180, and in a countersink of shaft 191. Balls 196 counteract the axial thrust and eliminate any play in the bearing arrangement of cam 195.

Cam 195 cooperates with a cam follower 212 secured to a slide 200. This slide includes a flat portion 201 extending transversely of the free edges of the condenser plates, and cylindrical extrusions receiving balls 202 riding along groove 186. The slide is provided at either end with upturned ears 203, 204 and strips 205 and 206 extend between each pair of ears and are secured to the ears by soldering as will be explained later. These strips have holes receiving balls 207, 207 which engage corresponding holes in links 208, 208. The other ends of these links have holes receiving balls 210, 210 which set in the previously described countersinks 181 in the free edges of plates 175 and 185. A U-shaped wire spring 211 extends around the plates, having its bight engaging plate 180 and its free ends secured to links 208. The spring tends to pull the links 208, 208 toward the plates and presses balls 210 and 207 into their seats. Balls 207 press balls 202, 202 into the groove 186 of plate 180 by means of the strips 205, 206 and slide 200. This way the whole mechanism is held under tension and all bearing play is eliminated. During assembly, the ends of spring 211 receive a torsional mounting tension, which tends to rotate the links 208, 208 in such a way that the slide presses cam follower 212 against cam 195. Round pads 235 of dielectric material hold slide surface 200 spaced from chassis 171.

As cam 195 is rotated, the previously described tension of spring 211 holds cam follower 212 in engagement with the cam surface. The slide moves along groove 186, and by means of links 208, 208 operates plates 175 and 185, thus varying the opening angle between the plates and the capacity of the condenser. Fig. 27 shows the mechanism positioned in such a way that the plates assume their largest spacing, i. e. the condenser reaches its minimum capacity. Fig. 28 shows the mechanism in what may be termed the initial position, with links 208, 208 perpendicular to the slide travel and with plates at minimum spacing and therefore the condenser in maximum capacity position.

In order to adjust the condenser, the cam is brought to this initial position, and the cam follower held in engagement with the cam surface. Links 208, 208 are held by a jig in order to make sure that they are perfectly perpendicular to the plate 180, as viewed in Fig. 28. By moving the links toward or away from plate 180 the distances between the center plate and each outer plate can be set individually and thus the two capacities of the condenser. When this is accomplished, strips 205 and 206 are soldered to ears 203 and 204 of the slide, as indicated at 236, 237, respectively, in order to set the mechanism permanently to this predetermined relation. By rotating shaft 191 the condenser will assume a predetermined capacity relative to each shaft position. As plates 175 and 185 have individual means of adjustment, the two capacities of the condenser can be set to have any desired padding effect relative to each other, as previously described with particular references to Fig. 18. By using different metals for the links 208 and slide 201, the temperature coefficient of the condenser can be adjusted to an extremely small value.

Trimmer condensers are mounted between the center plate and each of the outer plates. The electrically conductive surfaces 184 of plate 180 are used as one electrode of the trimmer condensers. The second electrode is formed by parts 214 made of spring metal, and clamped between insulating washers 215, 216 by means of a rivet 217, and thus secured in their location at the lower end relative to plate 180. Each spring 214 has a center tongue 220 struck out therefrom, which is secured by a rivet 221 to plates 175 and 185 respectively and thus in electrically conductive engagement with the terminal strips 178 of electrodes 176. As can be seen, the upper part of spring 214 is independent of tongue 220 in its movement toward and away from plate 180.

Threaded bushings 223, 223, are secured to chassis 171 and screws 222, 222 of dielectric material are inserted, with their bullet-shaped ends engaging lips 224 of springs 214. The springs 214 have a tendency to move away from plate 180. By moving screws 222 down, lips 224, and thus springs 214 are forced toward plate 180, increasing the capacity between the electrically conductive surfaces 184 of plate 180 and springs 214. The latter are in electrical contact with electrodes 176, forming therewith trimmer condensers, serving known purposes. By providing the previously mentioned recesses 183 in plate 180, the clearance for spring 214 is increased and thus the minimum capacity of the entire condenser reduced. In order to prevent short circuits between the electrodes facing each other, the conductive surfaces 184 of plate 180 are covered with an insulating coating. This coating has to be removed under the lower ears 231 of chassis 171 in order to obtain an electrically conductive connection between surface 184 and chassis 171.

The above described chassis assembly, with capacities adjusted as described is mounted in a housing 170, having a somewhat T-shaped form and being made preferably of sheet metal, to obtain a shielding effect. It is a preferred execution to solder chassis 171 to housing 170. Bushings 239 of dielectric material having eyelets with lugs 219 secured to it, are threaded from outside into chassis 171 and somewhat L-shaped shields 213 are secured between bushings 239 and housing 170. These shields serve as ground connections and at the same time shield lugs 219, 219 from each other. In order to finish the assembly, lugs 219 are soldered to the springs 214 at 218. Three spade bolts 238 are secured to housing 170 and serve as mounting means for the condenser.

The described construction provides a novel variable condenser unit in a compact form including associated trimmer condensers, having one electrode in common with one main variable condenser electrode. The operation of the condenser is easily effected by rotation of the shaft extension 193.

The condensers constructed according to the present invention have the advantage of stability, reliability and compactness. Capacity variations due to mechanical stress and changes of ambient conditions are reduced to a minimum by the use of rigid plates arranged in a structurally stable triangular relation. Close tolerances can be kept on the capacity curves, and thus high precision condensers built. Compactness is achieved by the ability to use very small initial plate separations and due to the required small relative movements of the plates.

While specific embodiments of the invention have been shown and described in detail to illustrate the application of the principles thereof, it should be understood that such illustrations are exemplary and that the invention may be otherwise embodied without departing from such principles.

What is claimed is:

1. A variable condenser comprising, in combination, hingedly interrelated rigid plates bearing on each other along a hinge line; said plates having electrically conductive surfaces forming electrodes; means disposed between and interengaged with facing surfaces of said plate adjacent the hinge line and limiting substantially parallel relative movement of said plates to control shifting of the hinge line relative to said plates; at least one of said electrically conductive surfaces being substantially rectangular, with one side thereof parallel to the hinge line, the width of said one conductive surface, measured along a perpendicular to the hinge line, being from one-half to twice the distance between the hinge line and the nearest side of said one conductive surface; and means operative to vary the angle between said plates to vary the capacity of the condenser.

2. A variable condenser comprising, in combination, hingedly interrelated rigid plates bearing on each other along a hinge line; said plates having electrically conductive surfaces forming electrodes; means disposed between and interengaged with facing surfaces of said plate adjacent the hinge line and limiting substantially parallel relative movement of said plates to control shifting of the hinge line relative to said plates; and means operative to vary the angle between said plates to vary the capacity of the condenser; at least one of said plates having a plurality of conductive surfaces spaced from each other in a direction parallel to the hinge line, each constituting an electrode and each cooperative with a conductive surface on another plate to constitute a plurality of individual capacities; the inner edges of said spaced conductive surfaces being spaced substantially from the hinge line in a direction perpendicular to the latter.

3. A variable condenser comprising, in combination, a first rigid plate; a plurality of second rigid plates each hingedly interrelated with said first plate; said plates each having electrically conductive surfaces forming electrodes; means defining the position of the hinge line relative to said plates; and means individually operative to adjust the initial angle of each second plate to said first plate, whereby each of said second plates may have an initial adjustment differing from the other second plates; and means operative to vary the angle between said plates to vary the capacity of the condenser.

4. A variable condenser comprising, in combination hingedly interrelated rigid plates said plates having electrically conductive surfaces forming electrodes; means defining the position of the hinge line relative to said plates; and means operative to vary the angle between said plates to vary the capacity of the condenser; at least one of said plates having a recess facing another plate, and a trimmer condenser mounted in said recess having one of its electrodes constituted by a conductive surface of one of said plates.

5. A variable condenser comprising, in combination, a pair of hingedly interrelated rigid plates bearing on each other along a hinge line; said plates having electrically conductive facing surfaces forming electrodes; the electrodes of one plate being coplanar and those of the other plate being stepped; means disposed between and interengaged with facing surfaces of said plate adjacent the hinge line and limiting substantially parallel relative movement of said plates to control shifting of the hinge line relative to said plates; and means operative to vary the angle between said plates to vary the capacity of the condenser.

6. In a variable condenser of the type comprising a pair of hingedly interrelated rigid plates having electrically conductive surfaces forming electrodes and means operative to vary the angle between the plates to vary the capacity of the condenser; means controlling shifting of the hinge line relative to said plates, said means comprising facing recesses in the juxtaposed surfaces of said plates and a ball in each facing pair of recesses, at least one recess of each pair intersecting a plate surface in a sharp edge riding on the surface of the ball during hinging movement of said plates, the sharp edges of said recesses being V-shaped in the plane of the surface; and resilient means biasing said plates toward each other substantially at the hinge line and in opposite directions parallel to said surfaces to maintain such sharp edges bearing on said balls to lock the plates against uncontrolled relative sliding movement.

7. In a variable condenser of the type including a pair of hingedly interrelated rigid plates having electrically conductive surfaces forming electrodes and means operative to vary the angle between the plates to vary the capacity of the condenser; a hinge line shifting control arrangement comprising a pair of grooved pins secured in projecting relation to one plate, the other plate being recessed on an edge to rest on said pins; a third grooved pin secured in projecting relation to the other plate; and a spring engaged in the grooves of said pair of pins on the sides of the latter spaced from said recessed plate edge and in the groove of the third pin inwardly of such recessed plate edge, said spring engaging the outer surface of such other plate, to bias the plates toward each other and the other plate toward said pair of pins to control shifting of the hinge line relative to the plates.

8. In a variable condenser of the type including a pair of hingedly interrelated rigid plates having electrically conductive surfaces forming electrodes and means defining the position of the hinge line relative to the plates; mechanism operative to vary the angle between the plates to vary the capacity of the condenser, said mechanism comprising a cam surface extending longitudinally along the inner surface of one plate; a member slidably mounted on the inner surface of the other plate for movement therealong in longitudinal alignment with said cam surface; and a cam follower secured to said member for engagement with said cam surface; the connection of said cam follower to said member being made by soldering to provide for accurate setting of the initial opening angle of the plates.

9. In a variable condenser of the type including a pair of hingedly interrelated rigid plates having electrically conductive surfaces forming electrodes and means defining the position of the hinge line relative to the plates; mechanism operative to vary the angle between the plates to vary the capacity of the condenser, said mechanism comprising a cam follower arranged to be secured to one plate; and a slide movably mounted on the other plate and having a cam surface continuously engaged by said cam follower; the connection of said cam follower to said one plate being made by soldering to provide for accurate setting of the initial opening angle of the plates.

10. In a variable condenser of the type including a pair of hingedly interrelated rigid plates having electrically conductive surfaces forming electrodes and means defining the position of the hinge line relative to the plates; mechanism operative to vary the angle between the plates to vary the capacity of the condenser, said mechanism comprising a slide mounted for sliding movement along one plate and having a plurality of cam surfaces differing in profile; a cam follower secured to the other plate and engaging said cam surfaces, whereby movement of said slide will vary the opening angle of said plates; a plurality of cam means mounted on said one plate and each selectively engageable with said slide to move the same to align a different one of said cam surfaces with said cam follower; and means connected to said slide and said one plate and selectively operable to bias said slide into engagement with a selected cam means to engage said follower with a selected cam surface; the connection of said cam follower to said other plate being made by soldering to provide for accurate setting of the initial opening angle of the plates.

11. In a variable condenser of the type including a pair of hingedly interrelated rigid plates having electrically conductive surfaces forming electrodes and means defining the position of the hinge line relative to the plates; mechanism operative to vary the angle between the plates to vary the capacity of the condenser, said mechanism comprising a slide mounted for sliding movement along one plate and having a plurality of cam surfaces differing in profile; a cam follower secured to the other plate and engaging said cam surfaces, whereby movement of said slide will vary the opening angle of said plates; a pair of cam means mounted on said one plate at either end of the path of movement of said slide and each selectively engageable with said slide to move the same to align a different one of said cam surfaces with said cam follower; and means connected to said slide and said one plate and selectively operable to bias said slide into engagement with a selected cam means to engage said follower with a selected cam surface; the connection of said cam follower to said other plate being made by soldering to provide for accurate setting of the initial opening angle of the plates.

12. In a variable condenser of the type including a pair of hingedly interrelated rigid plates having electrically conductive surfaces forming electrodes and means defining the position of the hinge line relative to the plates; mechanism operative to vary the angle between the plates to vary the capacity of the condenser, said mechanism comprising a slide mounted for sliding movement along one plate and having a plurality of cam surfaces differing in profile; a cam follower secured to the other plate and engaging said cam surfaces, whereby movement of said slide will vary the opening angle of said plate; a pair of rotary cams mounted on said one plate at either end of the path of movement of said slide and each selectively engageable with said slide to move the same to align a different one of said cam surfaces with said cam follower; and means connected to said slide and said one plate and selectively operable to bias said slide into engagement with a selected cam to engage said follower with a selected cam surface; the connection of said cam follower to said other plate being made by soldering to provide for accurate setting of the initial opening angle of the plates.

13. In a variable condenser of the type comprising three hingedly interrelated rigid plates, including an inner plate having electrically conductive surfaces forming electrodes and a pair of outer plates each having an electrically conductive surface forming an electrode cooperative with an inner plate electrode, and means defining the position of the hinge line relative to the plates; mechanism operative to vary the angle between the plates to vary the capacity of the condenser, said mechanism comprising a casing enclosing said plates and having a wall adjacent the free edges thereof; a groove along the free edge of the inner plate; a cam rotatably mounted on said wall on an axis perpendicular to such free edge on the inner plate and having rotary bearing engagement in such groove to fix the inner plate against swinging movement relative to said cam; a slide movably mounted on the free edge of said inner plate for movement along such groove; a pair of links each pivotally connected to said slide and each pivotally connected to an outer plate; and means connected to said plates and slide and biasing said slide into engagement with said cam for movement thereby along the groove to operate said links to swing the outer plates relative to the inner plate.

14. In a variable condenser of the type comprising three hingedly interrelated rigid plates, including an inner plate having electrically conductive surfaces forming electrodes and a pair of outer plates each having an electrically conductive surface forming an electrode cooperative with an inner plate electrode, and means defining the position of the hinge line relative to the plates; mechanism operative to vary the angle between the plates to vary the capacity of the condenser, said mechanism comprising a casing enclosing said plates and having a wall adjacent the free edges thereof; a groove along the free edge of the inner plate; a cam rotatably mounted on said wall on an axis perpendicular to such free edge of the inner plate and having rotary bearing engagement in such groove to fix the inner plate against swinging movement relative to said cam; a slide movably mounted on the free edge of said inner plate for movement along such groove; relatively rigid means pivotally secured to said slide and the outer plates; and means biasing said slide into engagement with said cam for movement thereby along the groove to operate said relatively rigid means to swing the outer plates relative to the inner plate.

15. In a variable condenser of the type including a pair of hingedly interrelated rigid plates having electrically conductive surfaces forming electrodes and means defining the position of the hinge line relative to the plates; mechanism operative to vary the angle between the plates to vary the capacity of the condenser, said mechanism comprising a slide mounted for sliding movement along one plate; and a link pivotally connected to said slide and pivotally connected to another plate; the connection of said link to at least one of the elements it interconnects being made by soldering to provide for accurate setting of the initial capacity of the condenser.

CHARLES N. EHRLICH.

REFERENCES CITED

The following references are of record in the file of this patent:

UNITED STATES PATENTS

| Number | Name | Date |
|---|---|---|
| 1,520,329 | Cherpeck | Dec. 23, 1924 |
| 1,538,472 | Crosley | May 19, 1925 |
| 1,698,190 | Fredrickson | Jan. 8, 1929 |
| 1,735,532 | Dubilier | Nov. 12, 1929 |
| 2,210,029 | Egerland | Aug. 6, 1940 |
| 2,429,085 | Albin | Oct. 14, 1947 |
| 2,474,988 | Sargrove | July 5, 1949 |
| 2,476,930 | Towle | July 19, 1949 |

FOREIGN PATENTS

| Number | Country | Date |
|---|---|---|
| 27,257 | France | Jan. 29, 1924 |
| 542,364 | Germany | Jan. 23, 1932 |